United States Patent [19]

Paszyc et al.

[11] 4,223,241

[45] Sep. 16, 1980

[54] ELECTROSTATIC CHARGE GENERATOR

[75] Inventors: Aleksy J. Paszyc; Kwang T. Huang, both of Ventura; Dallas M. Shiroma, Oxnard, all of Calif.

[73] Assignee: The United States of America as represented by the Secretary of the Navy, Washington, D.C.

[21] Appl. No.: 937,646

[22] Filed: Aug. 28, 1978

[51] Int. Cl.³ .............................................. H02N 1/10
[52] U.S. Cl. .................................. 310/308; 310/309; 322/2 A
[58] Field of Search ....................... 310/300, 308, 309; 322/2 R, 2 A

[56] References Cited

U.S. PATENT DOCUMENTS

| 2,004,352 | 6/1935 | Simon | 310/308 |
| 4,123,697 | 10/1978 | Paszyc et al. | 322/2 A |

*Primary Examiner*—Donovan F. Duggan
*Attorney, Agent, or Firm*—Richard S. Sciascia; Joseph M. St. Amand

[57] ABSTRACT

An electrostatic charge generator for continually providing charge carriers of a given polarity in a flow of dielectric fluid. The charge generator comprises a coaxial tube with an inner conductor wire coaxial with a hollow, cylindrical outer conductor. A D.C. potential is applied between the inner and outer conductors of the coaxial tube and a dielectric liquid, such as oil, is caused to flow therethrough. Since the intensity of the non-uniform electric field in the conductor tube is highest near the inner conductor, the electrostatic charges of the opposite polarity as the inner conductor are removed from the dielectric fluid faster than charges of the same polarity are removed at the outer conductor. This results in the dielectric fluid exiting the conductor tube carrying a charge of the remaining polarity.

10 Claims, 3 Drawing Figures

ELECTROSTATIC CHARGE GENERATOR

CROSS REFERENCE TO A RELATED APPLICATION

This application is related to patent application Ser. No. 812,883 filed July 5, 1977, now U.S. Pat. No. 4,123,697.

BACKGROUND OF THE INVENTION

The present invention relates to the field of electrostatic charge generators and more particularly to electrostatic charge generators for providing electrostatic charge carriers of a given polarity in a dielectric fluid. In even greater particularity, the present invention relates to such electrostatic charge generators for use in electrostatic high potential devices.

High potential devices capable of providing voltages in the tens-of-kilovolts range are widely used in the testing of insulation for electric machinery and cables. Standard high potential tests currently used include the AC high potential test and the DC high potential test.

AC testing is essentially a go/no-go test. The voltage is raised to a specified value and held for a specified length of time. The insulation is considered good if it can withstand the voltage without actually flashing over or breaking down or if the leakage current is not excessive. The current supply requirements in AC testing are quite high, and AC test sets tend to be very large. Since equivalent DC test sets are significantly smaller, DC high potential tests are widely employed to test insulation operation in an alternating current environment.

A standard DC high potential test is the leakage current versus voltage test. In this test, a voltage is applied across the insulation and raised in incremental steps up to and somewhat above the operating voltage. The steady state value of leakage current (after high initial capacitance and absorption currents) is noted at each step of voltage; as the test progresses, a curve of leakage current versus test voltage is determined. As long as this curve is relatively flat (equal increments of voltage giving equal increments of current), the item under test is considered to be in good condition. If the voltage is raised high enough, at some point, the current will start rising at a more rapid rate, appearing as a "knee" on the leakage current versus voltage curve. If the test is carried on beyond this point, the current increases at a much more rapid rate and breakdown soon occurs. Generally, the test procedure is to stop the voltage increments at this point, extrapolating the curve to estimate the breakdown voltage.

The DC high potential test, while versatile and widely used, has a number of disadvantages. The test set is still bulky and relatively immobile. In addition, for some types of insulation the knee occurs so close to the breakdown voltage that breakdown cannot be avoided. In this case, the DC high potential test exhibits the go/no-go characteristic of AC high potential testing which is undesirable in certain situations. This breakdown problem is a result of the current levels in present DC high potential test procedures, which, although in the milliamp range, result in large power dissipation requirements at tens-of-kilovolts.

The above limitations attendant to present DC high potential testing devices evidences a need for a high potential test device capable of providing the required voltage level at significantly lower current levels.

One such high potential test device is an electrostatic high potential system as disclosed in our copending patent application Ser. No. 812,883 filed July 5, 1977, now U.S. Pat. No. 4,123,697. The system includes a dielectric fluid circulating through an electrostatic charge generator comprised of a dome shaped ionizing chamber enclosing a series of spiral chambers and baffles. This electrostatic charge generator causes a circulating dielectric liquid (oil) to carry an electrostatic charge of a given polarity, making use of the excellent electrostatic charge carrying (insulating) properties of these fluids. These charges are removed from the dielectric fluid in an electrostatic charge collection apparatus which steadily accumulates electrostatic charge to obtain the extremely high (tens of kilovolts) potentials associated with DC high potential test equipment. The disclosed electrostatic high potential system has the capacity to generate these high potentials with a relatively small amount of charge (corresponding to the microamp range).

SUMMARY OF THE INVENTION

In the above context, the present invention is directed to an improved electrostatic charge generator capable of generating electrostatic charge carriers of a given one of either polarity in a circulating dielectric fluid.

Accordingly, the present invention provides an electrostatic charge generator which utilizes the phenomenon of electrostatic charge generation in a dielectric fluid flow. The electrostatic charge generator comprises a coaxial tube with an inner length of conductor wire coaxial with a hollow cylindrical outer conductor. A voltage supply provides a potential difference between the inner and outer conductor of the charge generator, and a dielectric fluid is circulated therethrough.

Since the intensity of the non-uniform electric field in the coaxial charge generator is highest near the inner conductor, electrostatic charges of the opposite polarity of this inner conductor are removed from the dielectric fluid more rapidly than the complementary charges are removed at the outer conductor. Thus, the dielectric fluid exiting the charge generator carries an amount of charge of the remaining polarity.

The novel features believed to be characteristic of the present invention are set forth in particularity in the appended claims. However, a more complete appreciation of the present invention, both as to organization and mode of operation, and many of the attendant advantages thereof will result as the same becomes better understood by reference to the following detailed description when considered in conjunction with the accompanying drawings.

DESCRIPTION OF THE PREFERRED EMBODIMENT

Electrostatic charges are generated in a dielectric fluid whenever the fluid comes in contact with another material. As used in the discussion herein, dielectric fluid refers to a liquid such as oil or a mixture of oil and water as hereinafter described. The generation and accumulation of electrostatic charges are dependent upon certain properties of the dielectric fluid, such as electrical conductivity and electrostatic charging tendency, as well as system design and fluid flow conditions. With the improved filtering and refining today, present dielectric fluids exhibit greater electrical resistance (lower conductivity) inhibiting charge recombination and thus allowing greater charge accumulation. This is to be contrasted with fluids such as water which generate considerable electrostatic charges which, due to high conductivity, recombine very quickly, precluding the charge accumulation.

The principal mechanism responsible for the electrostatic charge generation phenomenon in a dielectric fluid is the electric "double layer" at the boundary between a solid and a liquid or between two different liquids. (It is a misconception that the charges in a dielectric fluid are generated by the friction between the moving fluid and a conduit wall.) In the hydrocarbon fluid (oil), some impurities or foreign matters are dissolved as positive and negative charged ions. As a result of the absorption of ions of one polarity on the surface of the conduit carrying the flow, the dielectric fluid generally carries ions with the opposite charge to those on the conduit surface. An electric double layer is thus formed at the interface between the fluid and the solid conduit surface. The electrostatic charges remaining in the liquid are carried by the flow of the dielectric fluid resulting in a flow of electricity known as the streaming current. Continuous flow of the dielectric fluid can accumulate enough electrostatic charge to provide high potential levels (voltages in excess of 24 Kv have been observed in fueling operations).

The electrostatic charging tendency of a fluid varies from fluid to fluid but is greatly affected by the presence of impurities. For instance, it has been noted that a two-phase mixture (such as oil and water) is a very good electrostatic charge generator, with the types of impurities permitting higher charge generation appearing to be those that increase the charging tendency of the fluid without significantly affecting its electrical conductivity. As the conductivity of the two-phase mixture reaches a certain level, the electric double layer is destroyed (due to the rapid recombination of charges) and the charge generation effect ceases.

Figure 2:
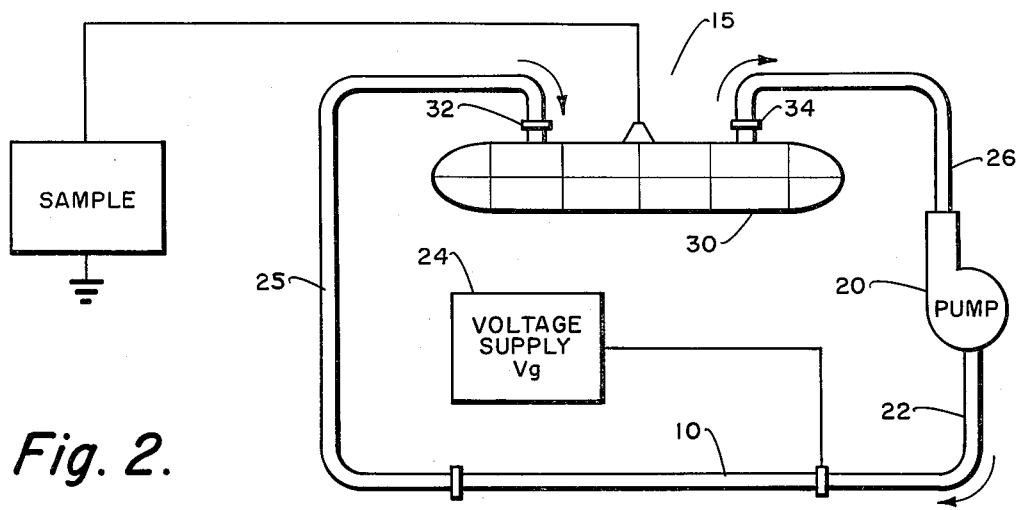
FIG. 2 is a schematic diagram showing an electrostatic high potential device incorporating the electrostatic charge generator.

Referring now to the drawings wherein like reference characters designate like or corresponding elements throughout the several views, FIG. 2 shows in schematic form an electrostatic charge generator 10 according to the present invention incorporated in an electrostatic high potential system 15. The electrostatic high potential system additionally comprises a pump 20 and an electrostatic charge collector 20. An electrostatic high potential system similar to that indicated at 15 is the subject of the above referenced copending application. As noted above, electrostatic charge generation therein is accomplished by means of a dome shaped ionizing shell enclosing a system of baffles and spiral passageways. Electrostatic charge generator 10 is an improved device for generating electrostatic charges of a given polarity in a circulating dielectric fluid, for example, oil or a mixture of oil and distilled water.

Figure 1:
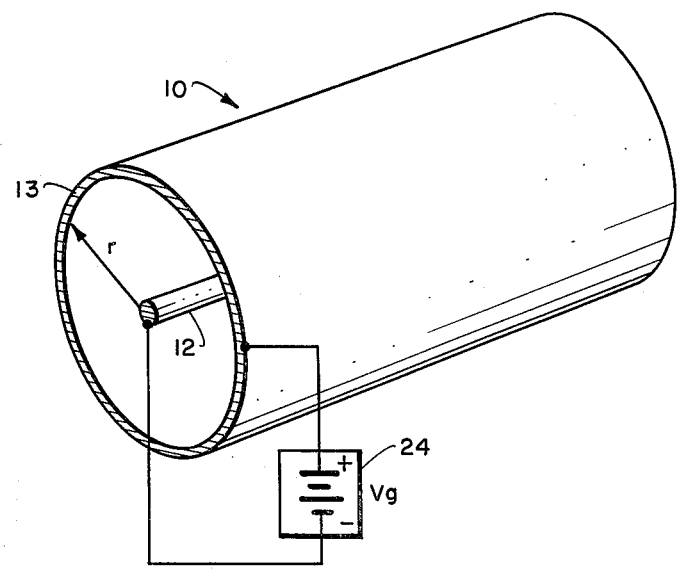
FIG. 1 is a cross-section, isometric view of a portion of the coaxial charge generator according to the present invention showing the inner and outer conductors.

Referring to FIG. 1, electrostatic charge generator 10 comprises a coaxial conductor having an inner conductor wire 12 coaxial with a hollow, cylindrical outer conductor 13. A voltage supply 24 applies a potential $V_g$ between outer conductor 13 and inner conductor 12 (inner conductor 12 being indicated to be at a negative potential).

Referring again to FIG. 1 and electrostatic high potential device 15, pump 20 causes a dielectric fluid to flow, via a conduit 22, through coaxial charge generation tub 10 at a predetermined rate (as explained below, this rate of flow should at a minimum be sufficient to cause the dielectric fluid to turbulently flow through the charge generator). As discussed below, the dielectric fluid exiting charge generation tube 10 carries a negative electrostatic charge. The negatively charged dielectric fluid flows through a conduit 25 into charge collection apparatus 30 via an inlet port 32. The dielectric fluid in charge collection apparatus 30 then flows back to pump 20 via an outlet port 34 and a conduit 26 to be recirculated.

Charge collection apparatus 30, as disclosed in the above referenced copending patent application, comprises an electrically conductive dome shaped shell enclosing spiral passageways and tree electrodes. The points of the tree electrodes intensify the electric field and act to discharge the negative electrostatic charge carried by the dielectric fluid, i.e., draw off the negative charges and accumulate them along the equipotential surface of the conductive shell of charge collection apparatus 30. In this manner, the large (tens-of-kilovolts) potentials associated with high potential devices can be accumulated on charge collection apparatus 30.

The electrostatic charge generation process embodied in coaxial charge generator 10 actually comprises two separate mechanisms: the electric double layer effect, described above with respect to ionized impurities in dielectric fluid flow, and a dielectrophoresis effect arising from the non-uniform electric field within the charge generator. As discussed above, a certain degree of electrostatic charge generation (the streaming current) occurs whenever a dielectric fluid flows through a solid tube, as a result of the transfer of charge from ionized impurities of a given polarity to the tube. This electric double layer effect is enhanced in the present invention by reason of the applied potential difference $V_g$ between inner conductor 12 and outer conductor 13 of coaxial charge generator 10. Ionized impurities in the dielectric fluid are drawn toward the complementarily charged conductor. However, since the intensity of the non-uniform electric field is highest near inner conductor 12 (which is at a negative potential with respect to outer conductor 13), positive charges are drawn out of the dielectric fluid relatively more rapidly than are negative charges. This results in a gradual accumulation of negative charge carriers as the dielectric fluid flows through coaxial charge generator 10.

Figure 3:
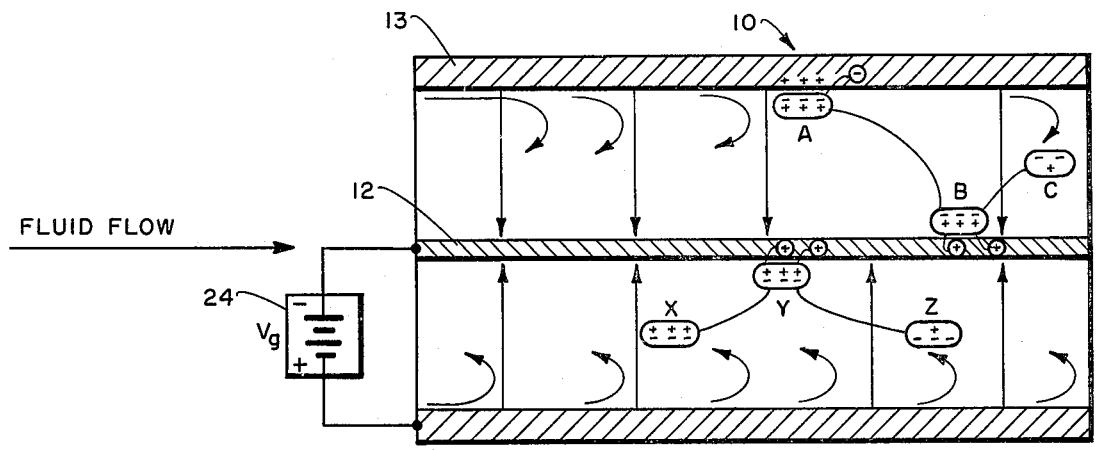
FIG. 3 is a longitudinal cross-section of the coaxial charge generator illustrating the charge generation mechanisms which provide the electrostatic charge carriers.

Further enhancing the electric double layer mechanism is the ionizing effect on the electrically neutral hydrocarbon molecules of the dielectric fluid within coaxial charge generator 10. As best explained with reference to FIG. 3, electrically neutral hydrocarbon molecules contacting the relatively large surface area of outer conductor 13 (A) tend to be positively ionized through the loss of negative charge to the positively charged outer conductor. These positively charged ions than behave in the same manner as positively ionized impurities, migrating under the influence of the non-uniform electric field toward inner conductor 12 (B). As in the case of ionized impurities, the negatively charged inner conductor 12 draws off positive charge leaving a negatively charged hydrocarbon molecule (C). And, if the dielectric fluid flows through coaxial charge generation tube 10 at a rate sufficient to produce turbulence within the tube, the turbulent flow adjacent to outer conductor 13 (indicated by the curved arrows in FIG. 3) continuously sweeps ionized hydrocarbon molecules away from the outer conductor toward inner conductor 12, enhancing the flow of positively charged ions toward this inner conductor. Thus the importance of circulating the dielectric fluid through charge generator 10 at a rate sufficient to insure a turbulent flow.

The second charge generation mechanism results from the "dielectroporesis" effect of a non-uniform electric field on an electrically neutral molecule. As best explained with reference to FIG. 3, electrically neutral hydrocarbon molecules become polarized in the non-uniform electric field which exists between outer conductor 13 and inner conductor 12 of coaxial charge generator 10 (X). This polarization effect of the electric field within charge generator 10 can be seen as producing induced electric dipoles of the electrically neutral hydrocarbon molecules within the dielectric fluid. The non-uniform electric field causes a measure of corresponding alignment of these induced dipoles. Because the field is non-uniform, one end of the dipole is in a weaker field than the other. Thus, a net force results and the hydrocarbon dipole is pulled towards the area of greatest field intensity, i.e., the area of inner conductor 12 (Y). As these electric dipoles are drawn into contact with the negative polarity of inner conductor 12, positive charges are removed from the molecules resulting in additional negative charge carriers (Z).

The above described electrostatic charge generation mechanisms combine to produce an abundance of negative charge carriers in the dielectric fluid as the fluid traverses coaxial charge generator 10. Also, it is apparent that if the polarity of $V_g$ (and, consequently, of the inner conductor of electrostatic charge generator 10) is reversed, the dielectric fluid would carry a predominance of positive rather than negative charges. Thus, the polarity of the accumulated electrostatic potential on electrostatic charge collection apparatus 30 can be controlled.

In a preferred embodiment of the electrostatic charge generator according to the present invention, coaxial charge generator tube 10 is approximately three feet long and comprised of a one-half inch diameter copper tube as outer conductor 13, and an uninsulated copper wire as inner conductor 12. When this electrostatic charge generator is disposed in electrostatic high potential device 15 and a two-phase dielectric fluid mixture (a liquid consisting of ten parts transformer oil to one part distilled water) is caused to circulate therethrough at a rate of approximately three gallons per minute, electrostatic potentials in the neighborhood of 50 kilovolts can be obtained for a value of $V_g$ of forty volts DC. (For most high potential testing, a DC voltage of 30 kilovolts is sufficient.)

The value of $V_g$ can be increased to obtain a more rapid generation of charge carriers and a correspondingly more rapid electrostatic potential build-up in electrostatic charge collection apparatus 30. However, increases in $V_g$ beyond a certain point (depending upon the type of oil and the type and amount of additives) results in an abrupt cessation of generated voltage, due to the breakdown of the oil causing an increase in conductivity of the dielectric fluid. This prevents any substantial charge from building up.

Obviously, other embodiments and modifications of the present invention will readily come to those of ordinary skill in the art having the benefit of the teachings presented in the foregoing description and the drawings. It is therefore to be understood that this invention is not to be limited thereto and that said modifications and embodiments are intended to be included within the scope of the appended claims.

What is claimed is:

1. An electrostatic charge generator for continuously providing charge carriers of a given polarity in a flow of dielectric liquid, comprising:
   a. a coaxial tube comprising:
      1. an inner conductor wire; and
      2. a hollow, cylindrical outer conductor coaxial with said inner conductor;
   b. voltage means for applying a DC potential between said inner and said outer conductor; said DC potential creating a non-uniform field the intensity of which is highest near said inner conductor;
   c. a circulating dielectric liquid;
   d. flow means for causing said dielectric liquid to continuously circulate through said coaxial tube at a rate to insure a turbulent flow;
   e. said dielectric liquid being depleted of charges of the opposite polarity of said inner conductor more rapidly then complementary charges are removed at the outer conductor as the dielectric liquid is caused to flow through said coaxial tube, such that the dielectric liquid exiting said coaxial tube carries charges of the complementary polarity;
   f. the polarity of said voltage means operable to be reversed for changing the polarity of the charges carried by said dielectric liquid and thus control the polarity of the accumulated charges; and
   g. said dielectric liquid comprising a two-phase mixture consisting of from 90 to 100 percent oil and from 0 to 10 percent distilled water.

2. The electrostatic charge generator as recited in claim 1 wherein said dielectric liquid comprises 100 percent oil and 0 percent distilled water.

3. The electrostatic charge generator as recited in claim 2 wherein said coaxial tube comprises:
   a. an inner conductor of uninsulated copper wire; and
   b. an outer, cylindrical conductor of copper tubing.

4. An electrostatic charge generator as in claim 1 wherein the oil component of said dielectric liquid is transformer oil.

5. In an electrostatic high potential system which includes an electrostatic charge generation chamber and an electrostatic charge accumulation chamber together with means for continuously circulating a dielectric liquid therethrough, an improved electrostatic charge generation chamber comprising:
   a. a coaxial tube comprising:
      1. an inner conductor wire;
      2. a hollow, cylindrical outer conductor coaxial with said inner conductor; and
   b. voltage means for applying a DC potential between said inner and said outer conductor; said DC potential creating a non-uniform field the intensity of which is highest near said inner conductor;

c. said dielectric liquid being circulated through said coaxial tube at a rate to insure a turbulent flow and being depleted of charges of the opposite polarity of said inner conductor more rapidly than complementary charges are removed at the outer conductor such that the dielectric liquid exiting the coaxial tube carries electrostatic charges of the complementary polarity; and d. the polarity of said voltage means operable to be reversed for changing the polarity of the charges carried by said dielectric liquid and thus control the polarity of the accumulated charges.

6. The electrostatic charge generator as recited in claim 5 wherein said coaxial tube comprises:

a. an inner conductor of uninsulated copper wire; and b. an outer, cylindrical conductor of copper tubing.

7. The electrostatic charge generator as recited in claim 6 wherein said coaxial tube is approximately three feet in length and one-half inch in diameter.

8. The electrostatic charge generator as recited in claim 6 wherein said voltage means supplies a DC voltage of approximately 40 volts.

9. An electrostatic charge generator as in claim 6 wherein said dielectric liquid comprises a two-phase mixture consisting of from 90 to 100 percent oil and from 0 to 10 percent distilled water.

10. An electrostatic charge generator as in claim 9 wherein said oil is transformer oil.

* * * * *